T. E. POTTS.
GAS BROILER.
APPLICATION FILED MAR. 14, 1918.
1,294,159. Patented Feb. 11, 1919.
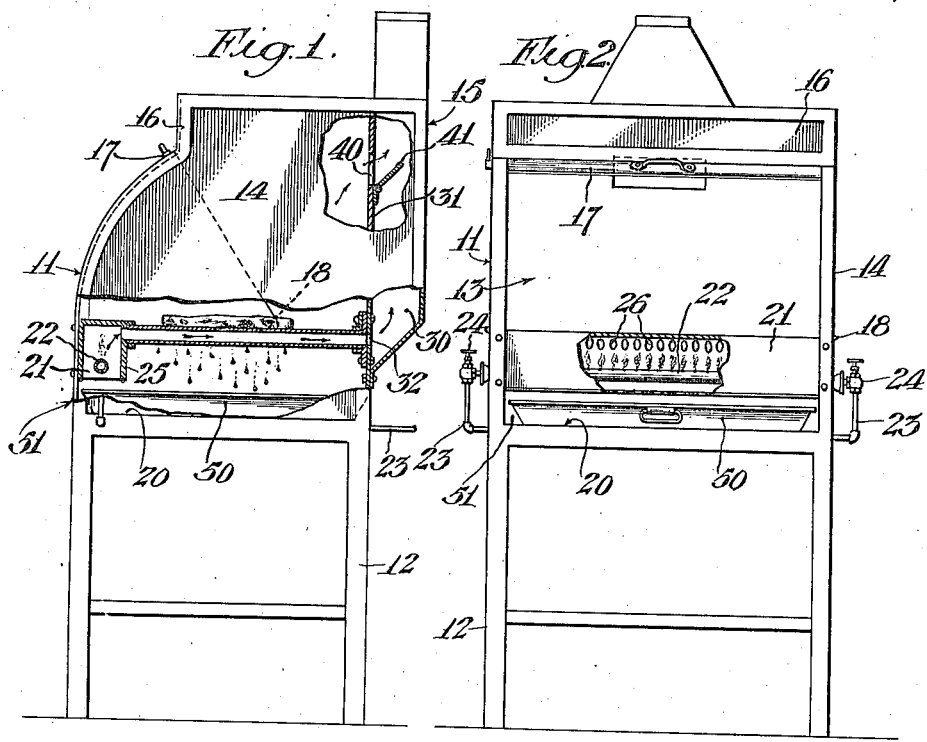
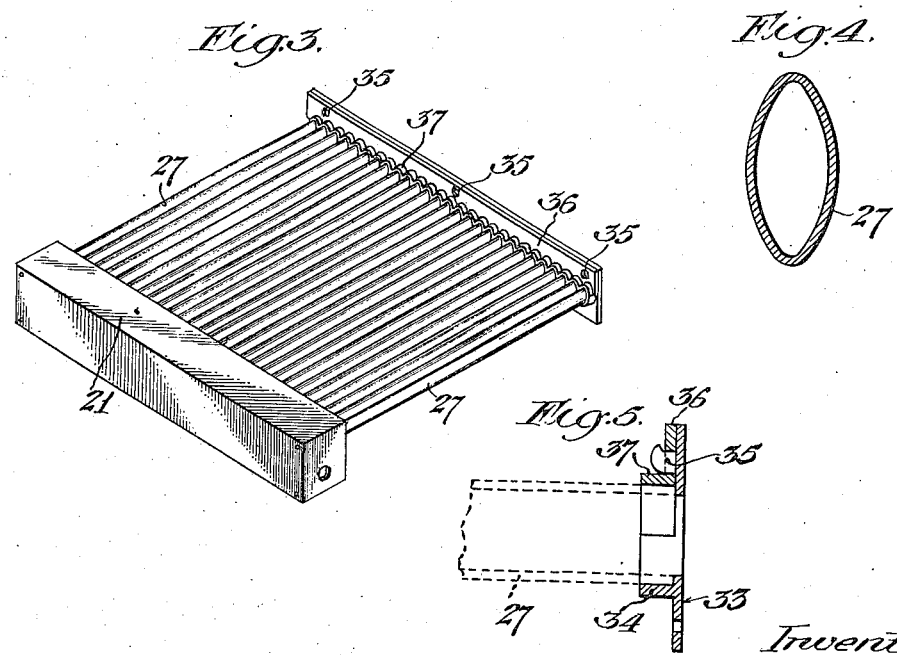
Inventor
Thomas E. Potts.

UNITED STATES PATENT OFFICE.

THOMAS E. POTTS, OF LOS ANGELES, CALIFORNIA, ASSIGNOR OF ONE-THIRD TO PETER MADSEN AND ONE-THIRD TO MARTIN MADSEN, BOTH OF LOS ANGELES, CALIFORNIA.

GAS-BROILER.

1,294,159.   Specification of Letters Patent.   Patented Feb. 11, 1919.

Application filed March 14, 1918. Serial No. 222,482.

*To all whom it may concern:*

Be it known that I, THOMAS E. POTTS, a citizen of the United States, residing at Los Angeles, in the county of Los Angeles, State of California, have invented a new and useful Improvement in Gas-Broilers, of which the following is a specification.

My invention relates to the culinary art, and more particularly to the art of broiling meat, particularly beef steak. In that art it is now common practice to secure the steaks on a metal grid and subject them to the direct or radiant heat of a mass of coals. Many attempts have been made to provide broilers which could utilize gas or oil as fuel, but such broilers are generally objectionable due to the fact that the flame is not shut off from the steak and the smoke and gases of combustion from a gas or oil flame have a very marked taste and odor and tend to contaminate the meat.

The principal object of my invention is to provide a broiler in which the steaks may be broiled in such a manner as to have the expected markings of the metal grid, and in which either gas or oil can be used as a fuel without danger of contaminating the meat.

In the ordinary type of broilers using coal, coke or charcoal as a fuel it is common practice to so arrange the fuel as to provide a bed of glowing coals over which the meat to be broiled is suspended on a metal grid. In this form of broiler the fats from the meat fall into the bed of coals and are burned. It is a further object of my invention to provide means in a broiler for saving and conserving all fats which may drip from the meat being cooked.

A still further object of my invention is to provide a broiler in which the meat to be broiled is placed on heated metal tubes which are so arranged that they can be readily removed for repair and for the purpose of being cleaned.

In the drawings, which are for illustrative purposes only,

Figure 1 is a side elevation of one form of my invention, portions thereof being cut away and other portions being shown in section to better illustrate my invention.

Fig. 2 is a similar front view.

Fig. 3 is a perspective view of the broiling elements.

Fig. 4 is a section on an enlarged scale of one of the tubes constituting a portion of the broiling element.

Fig. 5 is a section on a somewhat smaller scale through the end of one of the tube supporting means.

In the form of my invention illustrated in these drawings, a frame 11 is provided comprising legs 12 which support a broiling chamber 13 which is closed on the ends 14 and back 15, the front 16 having a door 17 pivoted on pins 18.

Secured inside the broiling chamber 13 at a small distance above the bottom 20 thereof is a combustion chamber 21 in which may be placed a gas burner 22 fed with gas by means of pipes 23, the flow of gas being regulated by valves 24. Cut in the back 25 of the combustion chamber 21 are a plurality of oval holes 26 in each of which one end of a tube 27 projects, these tubes being of the shape shown in Fig. 4 and being conveniently formed by flattening round tubes.

Secured inside the broiling chamber 13 and dividing the rear thereof into a flue chamber 30 is a partition or false back 31. Cut in this partition are a plurality of oval holes 32 which correspond in size, number and position with the holes 26. Secured to the front side of the partition 31 is a saddle casting 33 which is preferably bolted or riveted solidly to the partition 31. The tubes 27 each rest on a lip 34 formed in the saddle casting 33. The saddle casting 33 also has three hooks 35 equally spaced along its length and these hooks enter and engage slots formed in a cover casting 36. This cover casting also has lips 37 fitting over and restraining the tubes 27.

Cut in the partition 31 is a damper opening 40 which may be partially or wholly closed by an adjustable damper 41.

Supported on the bottom 20, below the tubes 27, is a drip pan 50 which may be readily removed through an opening 51 in the front 16.

The method of operation of my invention is as follows:

The steak or other piece of meat which it is desired to broil is placed on the tubes 27 by opening the door 17. Gas being supplied to the burner 22 through the pipes 23, a vigorous combustion takes place in the combustion chamber 21 and the hot gases of combustion pass from the chamber 21 through the tubes 27 and into the flue chamber 30 which is connected to a chimney, not shown, by a stove pipe, also not shown. The tubes 27, having the hot gases passing rapidly through the interior thereof, are heated and the meat is subjected to sufficient heat to thoroughly broil same, both by the heat directly conducted at the point of contact, and by radiant heat emanating from those parts of the tubes below and out of contact with the steak.

The drippings from the steak fall between the tubes 27 and are caught in the pan 50 which, being below the tubes 27, is cool so that all the fat which drips from the meat is saved without being burned.

During the roasting operation the door 17 may be conveniently closed and the damper 41 partly opened so that the smoke and fumes from the meat will be carried away by the natural draft of the chimney.

I have found that tubes like 27 to be efficient must be heated in part at least up to or even beyond a dull red heat and that when so heated soot and burned grease tends to collect thereon and incrust the tubes so that their efficiency is lowered. I have also found that when tubes are so heated that they will in time become crooked and that they sometimes split so that it is very desirable to be able to remove such tubes both for cleaning and for repair, and it is further desirable to be able to remove the tubes without the use of tools. It is for this reason that I use the method of supporting the tubes illustrated and described above. When the tubes bend, and they tend to do this due to unequal heating caused by the application of wet meat to the upper side when hot, or when they become so fouled that it is desirable to scrape and wash off the accumulations of grease and soot thereon, it is possible to do so quickly and easily without tools. The cook in such a case simply lifts the cover casting 36 from the saddle casting 33 and exposes one end of the tubes at the back of the broiler. Seizing this end of the tube and lifting it upwardly and outwardly it is possible to withdraw the other end from the openings 26, thus entirely freeing the tube. When the tube is removed the accumulated grease and soot can readily be removed and the tube straightened or a new tube substituted. The tubes may be replaced by a reverse operation to that described for removal.

It will be seen that the gases of combustion are never in direct contact with the meat being broiled and therefore that the taste of the gas cannot be transmitted to the meat. It will also be seen that the pan 50 catches and retains all the fats which drop from the meat.

What I claim is:—

1. A gas broiler comprising a plurality of horizontal tubes upon which the material to be broiled may rest and means for passing hot gases through said tubes.

2. A broiler as in claim 1 in which said means comprises a combustion chamber into which one end of each of the tubes is secured and a flue into which the other end of each of said tubes is secured.

3. A broiler as in claim 2 also comprising walls forming a broiling chamber surrounding said tubes and said combustion chamber and a door closing the front of said broiling chamber.

4. A broiler as in claim 1 also comprising a drip pan and means for supporting it below said tubes.

5. A broiler as in claim 2 also comprising means for securing said tubes in detachable relationship with said combustion chamber and said flue.

6. A broiler as in claim 5 in which the means for securing said tubes comprises sockets formed on the back of the combustion chamber into which the front end of said tubes may be slipped and split sockets secured to the front of said flue into which the back end of said tubes may be secured.

7. A broiler as in claim 6 in which said split sockets comprise a lower saddle casting permanently secured to said flue and having the lower half of each socket formed thereon and a cover casting detachably secured to said flue and having the upper half of each socket formed thereon.

8. A broiler as in claim 7 in which the means for detachably securing the cover casting comprises hooks formed on the saddle casting and projecting through and engaging openings in said cover casting.

9. A broiler as in claim 1 in which the horizontal tubes are spaced apart from each other.

10. A broiler as in claim 1 in which the horizontal tubes are imperforate.

In testimony whereof, I have hereunto set my hand at Los Angeles, California, this 7th day of March, 1918.

THOMAS E. POTTS.